United States Patent

[11] 3,613,845

[72] Inventor William L. Hollander
 Centralia, Mo.
[21] Appl. No. 863,874
[22] Filed Oct. 6, 1969
[45] Patented Oct. 19, 1971
[73] Assignee A. B. Chance Co.
 Grandview, Mo.

[54] CLUTCH OR BRAKE WITH ELECTRIC PILOT CLUTCH
 6 Claims, 5 Drawing Figs.
[52] U.S. Cl. .................................................. 192/8 R,
 192/9, 192/35, 192/40, 192/49, 192/77, 188/158,
 280/43.23
[51] Int. Cl. ...................................................... F16d 43/20
[50] Field of Search ........................................... 192/49, 8,
 9, 7, 13, 15, 17.2, 14, 35, 40, 37, 4, 4 A, 78

[56] References Cited
 UNITED STATES PATENTS
2,695,692 11/1954 Dorton ........................ 192/8
2,714,935 8/1955 Papp ............................ 192/49 X
2,729,298 1/1956 Tourneau ..................... 192/13 X
3,037,586 6/1962 Modersohn .................. 192/35 X
3,078,972 2/1963 Davis et al. .................. 192/35
3,177,995 4/1965 Mason ......................... 192/35

Primary Examiner—Benjamin W. Wyche
Attorney—Schmidt, Johnson, Hovey & Williams

ABSTRACT: A combination brake and drive apparatus for a low-speed high-torque vehicle but which is capable of being towed at unlimited speeds. A braking component is engageable with a vehicle-supporting wheel assembly to slow the vehicle when it is being towed at road speeds. The braking component is mounted on a rotatable worm wheel which is driven by a worm within the worm housing. A fluid motor turns the worm screw to drive the vehicle when the braking component is locked in engagement with the wheel assembly. The worm gear arrangement serves to effectively lock the drive mechanism when the fluid motor is not operating to thereby permit the apparatus to be used solely as a braking mechanism.

PATENTED OCT 19 1971

INVENTOR.
William C. Hollander
BY Schmidt, Johnson, Hovey,
Williams & Chase
ATTORNEYS.

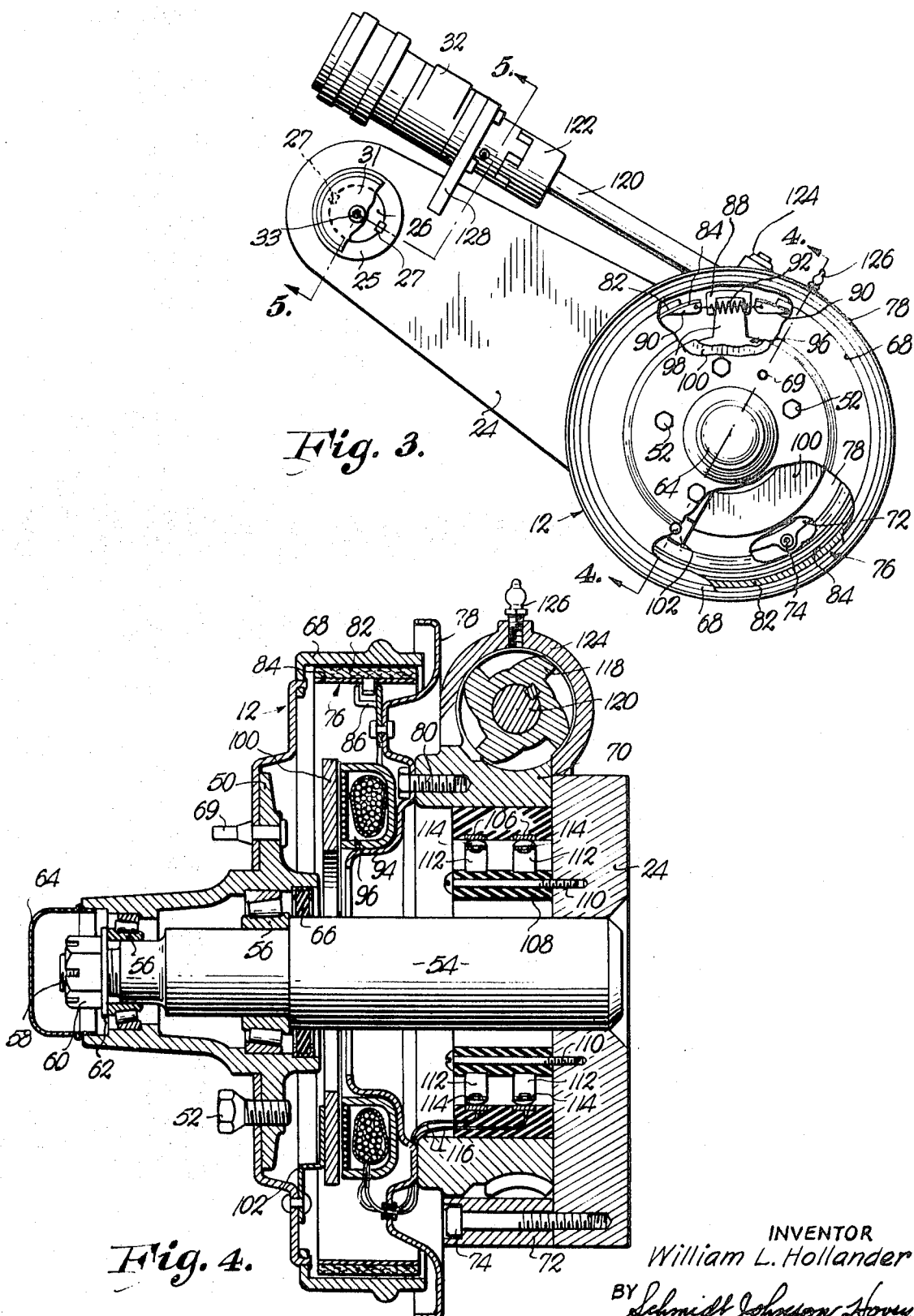

CLUTCH OR BRAKE WITH ELECTRIC PILOT CLUTCH

This invention relates to power drive mechanisms and, more particularly, to a combination brake and drive apparatus for a low-speed, high-torque vehicle.

Self-propelled, slow-speed vehicles are commonly used for many types of maintenance and construction machinery. Because of traffic congestion and the time required, it is normally not feasible to transport such machinery from one job to another by the same low-speed drive mechanism which normally propels the vehicle when it is in operation. Alternative methods for transporting these low-speed vehicles have included uncoupling the drive to free the wheels, raising the drive wheels off the road and substituting therefor freely rotatable transporting wheels, or placing the vehicle on a truck or trailer capable of normal highway speeds. All of these prior methods are relatively complicated and time-consuming, and the need has long been present for a low-speed, high-torque vehicle drive mechanism which does not interfere with towing of the vehicle at highway speeds. An inherent requirement of any such drive mechanism has been that it also be capable of performing a braking function for the vehicle when the latter is towed at highway speeds.

It is, therefore, an object of this invention to provide a low-speed, high-torque vehicle drive mechanism whereby it is possible to tow the vehicle at highway speeds using the drive wheels.

It is also an object of the invention to provide a drive mechanism as aforesaid which can be quickly disconnected from the drive wheels without mechanical uncoupling of any of the components of the mechanism.

Another object of the invention is to provide a combination vehicular brake and drive apparatus for a low-speed, high-torque vehicle wherein the drive mechanism is coupled to the drive wheels through the brake mechanism and when the drive mechanism is not in operation, the brake mechanism may be used independently to slow the vehicle.

Additionally, an object of the invention is to provide a combination brake and drive apparatus as aforesaid wherein the mechanical structure of the drive mechanism inherently locks the same to prevent its rotation when not in operation to thereby permit effective independent use of the brake mechanism.

Other objects of the invention will be made clear or become apparent from the following description and accompanying drawings, wherein:

FIG. 3 is an enlarged, side elevational view of one of the vehicle-supporting wheels with its inflatable tire removed, showing parts of the combination brake and drive apparatus and with certain portions broken away for purposes of clarity;

FIG. 4 is an enlarged, cross-sectional view taken along line 4—4 of FIG. 3 and showing details of the brake and drive apparatus.

Figure 1:
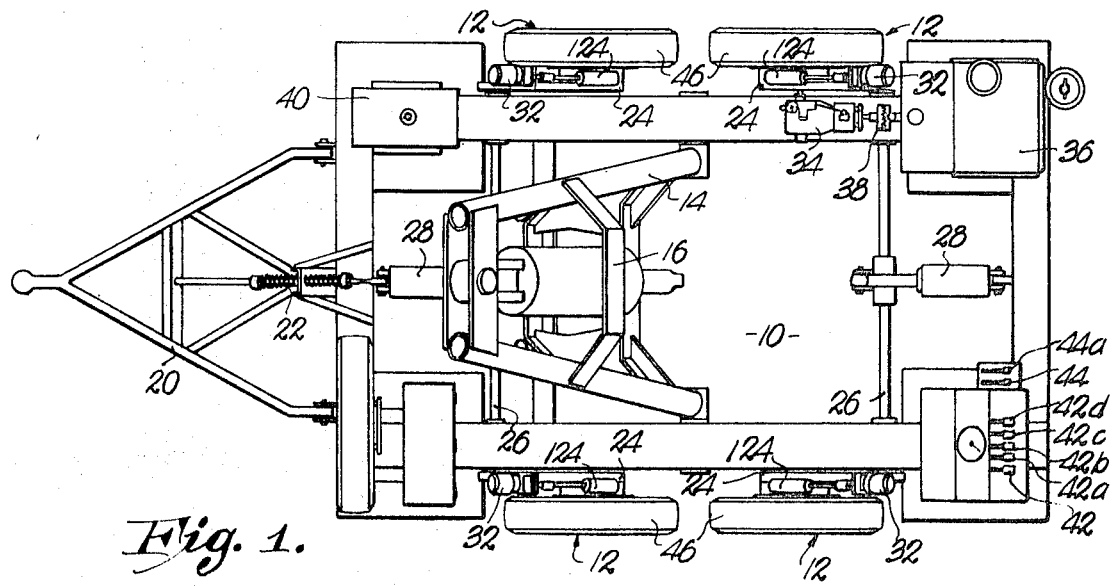
FIG. 1 is a plan view of a low-speed, high-torque vehicle which embodies the combination brake and drive apparatus of the present invention.
Figure 2:
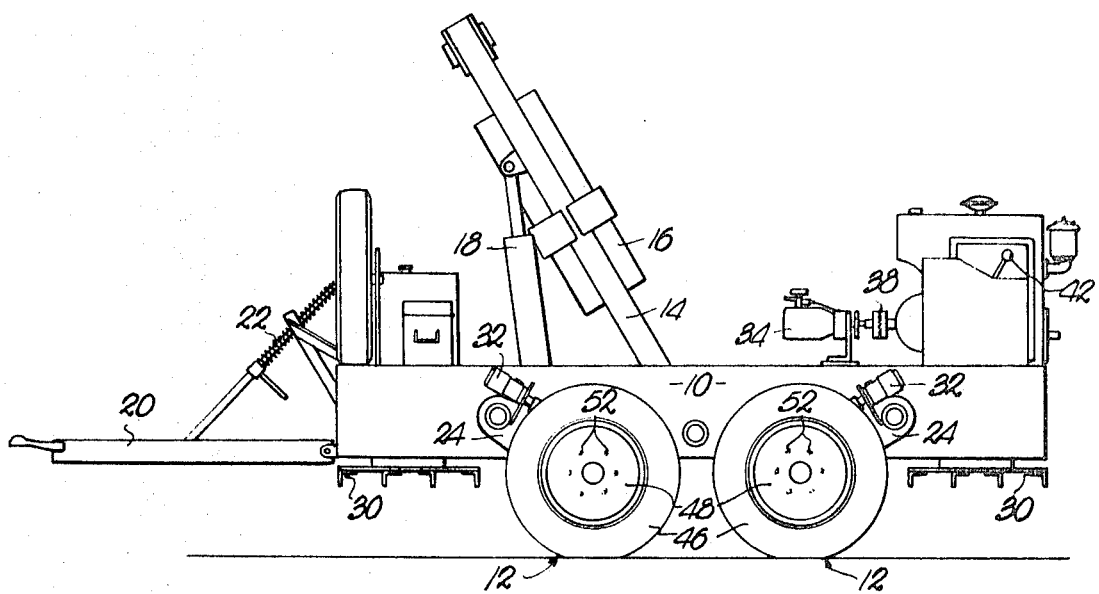
FIG 2 is a side elevational view of the vehicle shown in FIG. 1.
Figure 5:
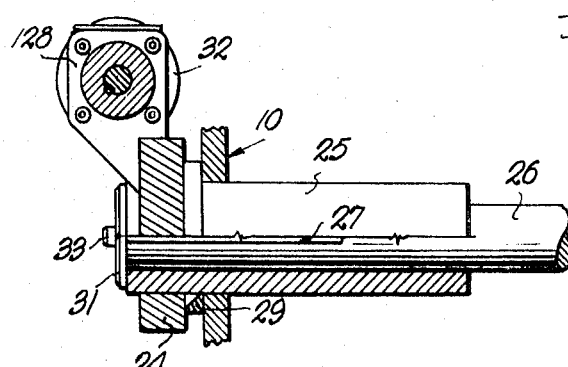
FIG. 5 is a cross-sectional view taken along line 5—5 of FIG. 3.

Referring initially to FIGS. 1 and 2, a low-speed, high-torque vehicle such as a trailer 10 adapted to be towed at road speeds, is supported by four rotatable wheel assemblies designated generally by the numeral 12. As one specific use of this type of trailer, an A-frame 14 is shown extending upwardly from the trailer 10 and supports a master pulling cylinder 16 for testing the holding power of earth anchors (not shown). A pair of hydraulic cylinders 18, one of which is visible in FIG 2, are connected to the A-frame 14 for changing the angle of disposition of the cylinder 16 relative to the ground. A tongue 20 is hinged to the frame of the trailer 10 and is held out of engagement with the ground by a suitable spring 22. Four wheel brackets 24 mount the respective wheel assemblies 12 on trailer 10. As illustrated in FIGS. 3 and 5, each of the brackets 24 is welded to a sleeve 25 which is rigidly secured to a connecting shaft 26 by a pair of keys 27. An annular spacer 29 holds each of the brackets 24 in spaced relationship to the trailer 10. Each of the shafts 26 extends transversely across the trailer 10 at opposite ends of the latter, and the ends of each of the shafts 26, with their respective sleeves 25 keyed thereto, are closed by a cap 31 which is held in place by a screw 33.

Each of the shafts 26 is rotatable and power means such as hydraulic cylinder 28 is connected to each of the shafts to rotate the same and thereby raise and lower the wheel assemblies 12 into and out of their ground-engaging positions. When the wheel assemblies 12 are moved out of their ground-engaging positions illustrated in FIG. 2, the flanged platform feet 30 of the trailer 10 give the latter a firm pulling base.

Each of the wheel assemblies 12 is driven by its own fluid motor 32 to which power is supplied by a conventional hydraulic pump 34 driven by a gasoline motor 36 through a corresponding clutch mechanism 38. Details of the hydraulic system including the various fluid conduits and couplings have not been illustrated in the drawings, although such details will be readily apparent to anyone skilled in the art. An oil reservoir 40 assures the availability of a continuous supply of fluid to the system. A control lever 42 operates the cylinder 28 to the left, viewing FIG. 1, to move the forward wheel assemblies 12 into and out of their ground-engaging positions, and a lever 42a similarly operates the rear wheel assemblies. A third lever 42b operates the master pulling cylinder 16, and a fourth lever 42c operates the cylinders 18. A fifth lever 42d operates accessory equipment. Levers 44 and 44a operate the four fluid motors 32, lever 44 operating the motors 32 on the left side of the trailer 10, and lever 44a operating the two motors 32 on the right side of the trailer 10.

Referring specifically to FIG. 4 where details of the brake and drive apparatus are shown, each of the wheel assemblies 12 includes an inflatable tire 46 carried by a wheel 48 which is secured to the wheel hub 50 therefor by a plurality of lug bolts 52. Each wheel hub 50 is rotatably mounted on an axle 54 by a plurality of roller bearings 56. The outer end of each axle 54 terminates in a threaded stud 58 which complementally receives a nut 60 and a washer 62 for holding the outer bearings 56 in position. The other end of each of the axles 54 is welded or otherwise rigidly secured to the respective wheel brackets 24. An axle cap 64 engages the end of the hub 50 in an interference fit to seal the outer end of the axle 54 and a sealing ring 66 disposed between the hub 50 and the axle 54 adjacent the inner bearings 56 prevents dirt and other contaminants from entering the bearings. The wheel hub 50 has rigidly secured thereto a brakedrum component 68 which includes a first section that extends radially outwardly from the hub 50, and a second section that extends inwardly toward the respective wheel bracket 24. A positioning pin 69 which extends through both the hub 50 and the brakedrum 68, assures proper alignment of the openings in the wheel 48 through which the bolts 52 extend with the apertures in the drum 68 and the hub 50.

A rotatable worm wheel support member 70 is disposed within a housing 72 in turn rigidly secured to a respective wheel bracket 24 by a plurality of bolts such as 74 or other suitable means. A brakeshoe component which includes a brakeshoe 76 and an annular backup plate 78 is coupled with the worm wheel 70 by bolts 80. The brakeshoe 76 includes a lining 82 that is supported by an expandable brake band 84, the latter being held in position within the brakedrum 68 by a plurality of brackets 86 connected to the backup plate 78. As illustrated in FIG. 3, the backup plate 78 has a projection 88 rigid therewith disposed on a vertical axis through the axle 54. The projection 88 serves as a stop for a pair of stub bosses 90 which are rigid with the brake band 84 at either end of the latter. A spring 92 connects the two ends of the brake band 84 and holds the brakeshoe out of engagement with the drum 68.

The backup plate 78 is configured to present an annular flange or shelf 94 which rotatably supports an electromagnet assembly 96. A projecting tab 98 which is rigidly secured to the electromagnet 96 extends between the two ends of the brake band 84. An armature 100 is positioned immediately adjacent the electromagnet assembly 96 and is secured to the radially projecting section of the brake drum 68 by a plurality of brackets 102.

A contact housing ring if insulating material is bonded or otherwise secured to the inner face of the worm wheel 70 and has embedded therein a pair of annular contact bands 106. An annular contact hub 108 which is secured to a respective wheel bracket 24 by screws 110 supports a pair of contact springs 112, each of which is provided with a plurality of contact rivets 114. Lead wires 116 provide electrical connection between the contact bands 106 and the electrical coil of the magnet assembly 96.

Power drive means for rotating the worm wheel 70 includes the motor 32 which is preferably of the orbiting-fluid type and a quadruple threaded worm screw 118 which is keyed to a drive shaft 120, the latter being driven by the motor 32 through a jaw coupling 122. The worm screw 118 is enclosed within a housing 124 which is provided with a grease fitting 126. The motor 32 is supported on the bracket 24 by a mounting plate 128. It is to be understood, of course, that appropriate lead wires (not shown) connect the contact hub 108 with a power source which may be the storage battery used for starting the gasoline motor 36.

In operation, the trailer 10 is generally towed by a truck or other vehicle to a location where it is to be used. When the trailer 10 has reached its destination, it is uncoupled from the towing vehicle and the wheel assemblies 12 are moved out of engagement with the ground to cause the feet 30 to support the trailer 10. This is accomplished by moving the appropriate levers 42 and 42a to actuate the cylinders 28, thereby rotating respective shafts 26 and moving the wheel assemblies 12 upwardly when viewing FIG. 2. Generally, the trailer 10 is maintained in a given position only long enough to permit coupling of the pulling cylinder 16 to an anchor to be tested followed by actuation of the pulling cylinder. This takes but a short time and it is then necessary to move the trailer 10 to another location. Thus, the wheel assemblies 12 are first lowered into their ground-engaging positions to raise the trailer 10 by moving the cylinders 28 in the opposite direction to that required to lower the wheels 12.

Current is applied to the coil of the electromagnet assembly 96 to magnetize the assembly core, thereby moving the armature 100 into engagement with the magnet assembly. Next, the appropriate levers 44 and 44a are moved to supply fluid to each of the motors 32. As the operation of all of the drive assemblies is identical, only one such operation is hereinafter described. The motor 32 rotates the worm screw 118 connected thereto which, in turn, rotates the worm wheel 70. Rotation of the worm wheel 70 moves the projection 88 on the backup plate 78 into engagement with one end of the brake band 84 and the associated projecting stub 90. This moves the brakeshoe 76 a short distance until the other end of the brake band 84 with its associated stub 90, engages the projecting tab 98 of the electromagnet assembly 96 to thereby spread the brakeshoe 76 and move the lining 86 into engagement with the brakedrum 68. Since the electromagnet is energized and the armature 100 is held firmly against the former, and since the armature 100 is secured to a respective wheel 48 through the brakedrum 68 and lugbolts 52, continued rotation of the worm wheel 70, after the brakeshoe 76 is locked in engagement with the brakedrum 68, rotates the wheel 48 to thereby drive the vehicle. The contact rivets 114 maintain wiping contact with the bands 106 during rotation of the worm wheel 70.

It will be appreciated that by operating only the motors 32 on either the right or the left side of the trailer 10 while the motors on the other side remain unoperated, the trailer 10 can be turned to either the right or the left. This is possible because the inherent arrangement of the worm gear formed by the screw 118 and the wheel 70, effectively locks the drive mechanism against rotation when fluid is not being supplied to the motor 32, thereby preventing the wheels 48 from turning whenever the brakeshoe 76 is locked in engagement with the brakedrum 68. Also, it is to be understood that the direction of travel of the trailer 10 is reversed by reversing the flow of fluid through the motors 32.

When the trailer 10 is being towed at highway speeds, the braking mechanism is independently operable to inhibit rotation of the wheels 48 and thereby slow the trailer. This is accomplished by energizing the coil of the electromagnet 96 to cause the armature 100 to engage the magnet. Since the wheel 48 and, therefore, the armature 100 is rotating, this causes the projecting tab 98 on the electromagnet 96 to move into engagement with one end of the brake band 84 and its associated stub 90. As the brakeshoe 76 then moves in the direction of rotation of the wheel, the other end of the brake band 84 with its associated stub 90, engages the projection 88 on the backup plate 78. This causes the brakeshoe to spread, bringing the brake lining 82 into engagement with the brakedrum 68. Since, as described above, the backing plate 78 is prevented from rotating by the worm gear arrangement of the drive mechanism, the wheel 48 is effectively braked to thereby slow the trailer.

It is to be understood of course that, while the invention has been described with reference to a low-speed, high-torque vehicle for carrying an anchor-testing cylinder, numerous other applications of the invention in maintenance and construction machinery, are contemplated. For example, the trailer 10 could have a flatbed for transporting heavy equipment and the low-speed, high-torque combination brake and drive apparatus of the present invention could be used to move the trailer into areas inaccessible to conventional trucks.

Having thus described the invention, what is claimed as new and desired to be secured by Letters Patent is:

1. In a power driven vehicle:
  a rotatable vehicle-supporting wheel member coupled with said vehicle;
  a rotatable support member adjacent said wheel;
  a brakedrum component;
  a brakeshoe component engageable with said drum component for inhibiting rotation of said wheel and to lock said shoe and said drum component together,
  one of said components being coupled with one of said members, the other of said components being coupled with the other of said members;
  an electromagnet assembly disposed within said brakedrum and engageable with said brakeshoe to cause the latter to move into engagement with said brakedrum;
  an armature coupled with said vehicle-support wheel and disposed adjacent said assembly for engagement therewith when the latter is energized to thereby move said assembly into engagement with said brakeshoe and cause the latter to engage said brakedrum; and
  drive means operable to rotate said support member when said shoe component is locked in engagement with said drum component to thereby drive said vehicle,
  said drive means including structure which operates to lock said supporting member against rotation when the drive means is not in operation.

2. Apparatus as set forth in claim 1, wherein said shoe component is coupled with said support member and said drum component is coupled with said wheel member.

3. Apparatus as set forth in claim 1, wherein said support member comprises a worm wheel and said drive means comprises a worm screw.

4. A combination vehicular brake and drive apparatus which is selectively operable to drive a vehicle at a low speed and brake the vehicle when the latter is being moved by means other than said drive apparatus, comprising:
  an axle coupled with said vehicle;
  a rotatable, vehicle-supporting wheel mounted on said axle;
  a brakedrum coupled with said wheel;
  a worm wheel mounted on said vehicle adjacent said vehicle-supporting wheel;
  a brakeshoe coupled with said worm wheel;

an electromagnet assembly disposed within said brakedrum and engageable with said brakeshoe to cause the latter to move into engagement with said brakedrum;

an armature coupled with said vehicle-supporting wheel and disposed adjacent said assembly for engagement therewith when the latter is energized to thereby move said assembly into engagement with said brakeshoe and cause the latter to engage said brakedrum; and a worm screw operable to rotate said worm wheel when said shoe is locked in engagement with said drum to thereby drive said vehicle.

5. In a railer adapted to be towed at road speeds:

a rotatable vehicle-supporting wheel assembly including a brakedrum coupled with said trailer;

a brakeshoe engageable with said wheel assembly to slow said trailer;

a rotatable support member mounting said shoe on the trailer, an electromagnet assembly disposed within said brakedrum and engageable with said brakeshoe to cause the latter to move into engagement with said brakedrum;

an armature coupled with said vehicle-supporting wheel and disposed adjacent said assembly for engagement therewith when the latter is energized to thereby move said assembly into engagement with said brakeshoe and cause the latter to engage said brakedrum; and drive means operable to rotate said support member when said shoe is locked in engagement with said wheel to thereby drive said trailer.

6. A drive mechanism for a low-speed, high-torque vehicle comprising:

a rotatable vehicle-supporting wheel coupled with said vehicle;

a brakedrum coupled with said wheel;

a worm wheel mounted on said vehicle adjacent said vehicle-supporting wheel;

a brakeshoe coupled with said worm wheel;

an electromagnet assembly disposed within said brakedrum and engageable with said brakeshoe to cause the latter to move into engagement with said brakedrum;

an armature coupled with said vehicle-supporting wheel and disposed adjacent said assembly for engagement therewith when the latter is energized to thereby move said assembly into engagement with said brakeshoe and cause the latter to engage said brakedrum;

a worm screw operable to rotate said worm wheel when said shoe is locked in engagement with said drum to thereby drive said vehicle; and a fluid motor coupled with said worm screw for rotating the same.